United States Patent Office 3,081,342
Patented Mar. 12, 1963

3,081,342
FLUOROALKYL ESTERS
Charles D. Ver Nooy, III, Newark, Del., assignor to E. I. du Pont de Nemours and Company, Wilmington, Del., a corporation of Delaware
No Drawing. Filed Sept. 29, 1960, Ser. No. 59,199
6 Claims. (Cl. 260—485)

This invention relates to new thermally stable compounds which are fluoroalkyl diesters of 3,3-dimethylglutaric acid.

In recent years, with the rapid development of high speed aircraft and like vehicles, there has been an increasing demand for stable fluids and lubricants to be used in recording and measuring instruments carried by such vehicles. It is desired that such fluids be capable of withstanding extreme temperatures for extended periods of time. It is further desired that these fluids be stable and operative at temperatures above 500° F., as well as at temperatures of −20° F. and below. It is also desirable that they have good hydrolytic stability and not thicken or gel on continued use. Another extremely desirable property is that they do not darken or discolor at elevated temperatures.

Conventional esterlubes and petroleum oils do not have satisfactory thermal and oxidative properties at temperatures above 300° F., while silicone oils gel at elevated temperatures. It is now generally recognized that dibasic acid esters of fluoroalcohols as a class have better oxidative and thermal stability, as well as lower flammability, than the conventional esterlubes and petroleum oils. However, oxidation studies have revealed that the known esters of such class darken or form a sediment at temperatures above 500° F. Faurote et al., in Ind. Eng. Chem. 48, 445–454 (1956), disclose fluoroalkyl esters of glutaric acid and of 3-methylglutaric acid and that branching, as in the 3-methylglutaric acid, increases the viscosity and lowers the viscosity index of the esters. Sommers et al., in U.S. Patent 2,840,593, disclose fluoroalkyl camphorates which are undesirably viscous for use as instrument fluids at low temperatures and darken considerably at high temperatures.

It is an object of this invention to provide a novel class of fluoroalkyl esters which have a combination of beneficial thermal, oxidative stability, and viscosity-temperature characteristics. Another object is to provide a class of fluoroalkyl esters which are fluids over a wide temperature range and which are resistant to deterioration and discoloration at high temperatures. A particular object is to provide fluoroalkyl esters which show a decided improvement in oxidative stability at high temperatures and have good low temperature characteristics. Other objects are to provide new compositions of matter and to advance the art. Still other objects will appear hereinafter.

The above and other objects may be accomplished by this invention which comprises the novel class of polyfluoroalkyl diesters of 3,3-dimethylglutaric acid which have the formula

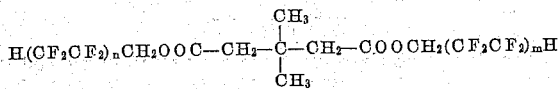

wherein each of $n$ and $m$ represents on integer of from 1 to 5.

It has been found that the diesters of the above defined class have high thermal and oxidative stabilities which are surprisingly superior to those of related materials, and have good viscosity-temperature characteristics. In particular, it has been found that the introduction of 2 methyl groups into the 3-position of the acid radical of the glutaric acid esters of fluoroalcohols results in a unique class of esters having a remarkable combination of valuable properties which are highly desirable in fluids to be used over a wide range of temperatures. Surprisingly, these diesters do not show any appreciable change in color when subjected to severe oxidative conditions at 500° F. and above, while related esters suffer objectionable color deterioration under such conditions. The introduction of the second methyl group in the acid radical of the 3-methylglutaric acid esters of the polyfluoroalcohols does not result in any appreciable change in viscosity-temperature characteristics, but unpredictably results in a large improvement in oxidative stability, whereby they are useful as stable fluids and lubricants in recording and measuring instruments subjected to more severe operating conditions, particularly higher temperatures.

The polyfluoroalkyl diesters of 3,3-dimethylglutaric acid of this invention have the formula

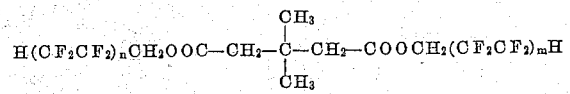

When $n$ and $m$ are 1–4, the esters are liquids at temperatures from about −20° F. or below to about 500° F. or higher, and have high oxidative stability at temperatures up to about 500° F. and above. Such normally liquid diesters are particularly suitable and superior for use as instrument and damping fluids in aircraft and industrial equipment which are subjected to severe oxidative conditions at high temperatures. The preferred diesters are those in which each of $n$ and $m$ is an integer of from 3–4 and such diesters, in addition to their high fluidity at low temperatures, are liquid and do not discolor at temperatures of 500° F. and above.

When $n$ and $m$ are 1 or 2, the diesters will be somewhat more volatile, but will exhibit a high degree of oxidative stability at 500° F. and will give satisfactory performance as stable fluids at low temperatures and under conditions where volatility is not a problem. When they are to be subjected to high temperatures, however, they should be used in closed, sealed systems, and may be used as hydraulic fluids in high speed aircraft to operate various controls, such as landing gear, which hydraulic systems conventionally are closed systems maintained under pressure. Such esters can also be applied in industrial hydraulic systems used for die-casting which are subjected to high temperatures. Also, the diesters of this invention in which $n$ and $m$ are from 1 to 4 are completely miscible and compatible with other more highly viscous fluoroalkyl esters, such as the fluoroalkyl camphorates disclosed by Sommers et al. in U.S. Patent 2,840,593, and, due to their greater fluidity at low temperatures, can be used to advantage as extenders for such more viscous esters to produce less viscous liquids.

When either or both of $n$ and $m$ in the above formula are 5, the diesters generally are low-melting solids. However, such solid diesters are useful as stable lubricants for use at high temperatures, particularly at temperatures of 500° F. and above.

Representative polyfluoroalkyl esters of this invention include:

Di-(1H,1H,3H-tetrafluoropropyl)-3,3-dimethylglutarate
Di-(1H,1H,5H-octafluoropentyl)-3,3-dimethylglutarate
Di-(1H,1H,7H-dodecafluoroheptyl)-3,3-dimethylglutarate
Di-(1H,1H,9H-hexadecafluorononyl)-3,3-dimethylglutarate
Di-(1H,1H,11H-eicosafluoroundecyl)-3,3-dimethylglutarate
Mixed 1H,1H,7H-dodecafluoroheptyl-1H,1H,9H-hexadecafluorononyl diester of 3,3-dimethylglutaric acid
Mixed 1H,1H,7H-dodecafluoroheptyl-1H,1H,11H-eicosafluoroundecyl diester of 3,3-dimethylglutaric acid.

The new diesters of this invention are conveniently obtained by esterifying 3,3-dimethylglutaric acid or a functional derivative thereof, preferably the anhydride, with the appropriate alcohol.

The alcohols, employed for making the diesters of this invention, are the polyfluoroalcohols having the formula $H(CF_2CF_2)_nCH_2OH$ wherein $n$ is an integer of from 1 to 5, preferably from 1 to 4. These polyfluoroalcohols are readily prepared, as described by Robert M. Joyce, Jr., in U.S. Patent 2,559,628, from tetrafluoroethylene and methanol by a telomerization process which comprises heating a mixture of tetrafluoroethylene and methanol in the presence of a peroxy or an azo catalyst. The alcohols, employed in making the diesters of this invention, include:

1H,1H,3H-tetrafluoropropyl alcohol ($C_3$), ($n=1$),
1H,1H,5H-octafluoropentyl alcohol ($C_5$), ($n=2$),
1H,1H,7H-dodecafluoroheptyl alcohol ($C_7$), ($n=3$),
1H,1H,9H-hexadecafluorononyl alcohol ($C_9$), ($n=4$),
1H,1H,11H-eicosafluoroundecyl alcohol ($C_{11}$), ($n=5$),
and mixtures of any two or more thereof.

The esterification process, involving the fluorotelomer alcohol and 3,3-dimethylglutaric acid, is carried out by conventional techniques. For example, the 3,3-dimethylglutaric acid and the fluorotelomer alcohol may be heated in toluene or other hydrocarbon or halohydrocarbon solvent. The esterification may be carried out with the aid of an acid catalyst; normally, a strong acid such as sulfuric acid, hydrochloric acid, p-toluene sulfonic acid, or perfluorobutyric acid is used. Mixtures of strong acids are also useful. The water of reaction is removed as the solvent refluxes. The mass is cooled and washed with dilute alkali to remove any remaining acid. The product may be purified by conventional techniques, such as distillation. Alternatively, the product may be purified by washing and stripping under vacuum. Impurities may be removed by solvent extraction, washing, adsorption on solid substrates, and the like. The products obtained are colorless to light yellow oils or solids, depending on the fluoroalcohol employed.

In order to more clearly illustrate this invention, preferred modes of carrying it into effect, and the advantageous results to be obtained thereby, the following examples are given, in which the amounts or proportions are by weight except where specifically indicated otherwise.

EXAMPLE 1

A mixture of 50 g. (0.31 mole) of 3,3-dimethylglutaric acid, 228 g. (0.686 mole) of 1H,1T,7H-dodecafluoroheptyl alcohol, 87 g. toluene and 1.8 g. concentrated sulfuric acid (sp. gr. 1.84) was refluxed with continuous removal of water as formed. The reaction mass was cooled, extracted with 1% aqueous solution of KOH, and the oil layer was separated. Toluene and water were removed by distillation. Activated carbon and activated alumina were added, and unreacted alcohol was removed by distillation at reduced pressure. The mass was filtered hot, yielding a colorless oil, the di-(1H,1H,7H-dodecafluoroheptyl)-3,3-dimethylglutarate of the following properties:

Viscosity, centistokes:
210° F. _____ 3.88
100° F. _____ 28.68
Viscosity index (ASTM-D567) _____ —54
ASTM slope (100–210° F.) _____ 0.896

Analysis.—Percent calculated for $C_{21}H_{16}O_4F_{24}$: carbon 32.04; hydrogen 2.03; fluorine 57.9. Found: carbon 32.8, 33.2; hydrogen 2.5, 2.1; fluorine 58.4, 58.5.

EXAMPLE 2

A mixture of 40 g. (0.25 mole) of 3,3-dimethylglutaric acid, 195 g (0.588 mole) of 1H,1H,7H-dodecafluoroheptyl alcohol and 75 ml. of toluene as reaction solvent was heated to reflux with continuous removal of water as formed. The crude ester was cooled to room temperature and made basic with 0.1 N KOH. The system was allowed to separate. The basic aqueous layer was decanted and the crude ester was washed with distilled water until the aqueous layer was neutral. After separation of the aqueous layer, the crude ester was treated with 5 grams of activated charcoal. The toluene and excess alcohol were removed by stripping under vacum; a final stripping being carried out at 0.4 mm. of mercury and 140° C. The hot fluoroester was filtered under suction, giving 179 grams (92.8% of theory) of the di-(1H,1H,7H-dodecafluoroheptyl) ester of 3,3-dimethylglutaric acid, a nearly colorless liquid which had the following properties:

Total acid No., mg. KOH/g. _____ 0.0
Viscosity, centistokes:
210° F. _____ 3.864
100° F. _____ 28.05
Viscosity index (ASTM-D567) _____ —46
ASTM slope (100–210° F.) _____ 0.892

Analysis.—Percent calculated for $C_{21}H_{16}O_4F_{24}$: carbon 32.04; hydrogen 2.03; fluorine 57.9. Found: carbon 31.8, 31.9; hydrogen 2.2, 2.0; fluorine 58.4, 58.7.

All the compounds falling within the scope of this invention may be prepared by following this procedure.

EXAMPLE 3

When the details of Example 1 were repeated, using a mixture of 166 g. (0.5 mole) of 1H,1H,7H-dodecafluoroheptyl alcohol ($C_7$) and 216 g. (0.5 mole) of 1H,1H,9H-hexadecafluorononyl alcohol ($C_9$), and 80 g. (0.5 mole) of 3,3-dimethylglutaric acid with 250 ml. benzene as solvent, a clear, water-white liquid at normal temperature and pressure was obtained. The vacuum distilled product was a mixture of di-(1H,1H,7H-dodecafluoroheptyl)-3,3-dimethylglutarate, di-(1H,1H,9H-hexadecafluorononyl)-3,3-dimethylglutarate and the mixed 1H,1H,7H-dodecafluoroheptyl-1H,1H,9H-hexadecafluorononyl-3,3 - dimethylglutarate, and had a boiling range of 160° C.–175° C. at less than 1 mm. of mercury.

EXAMPLE 4

The details of Example 1 were repeated using a mixture of 31.2 g. (0.094 mole) of 1H,1H,7H-dodecafluoroheptyl alcohol ($C_7$) and 100 g. (0.188 mole) of 1H,1H,11H-eicosafluoroundecyl alcohol($C_{11}$), 22.5 g. (0.141 mole) of 3,3-dimethylglutaric acid and 150 ml. of benzene. The mixture of di-(1H,1H,7H-dodecafluoroheptyl)-3,3-dimethylglutarate, di-(1H,1H,11H-eicosafluoroundecyl)-3,3-dimethylglutarate and the mixed 1H,1H,7H-dodecafluoroheptyl-1H,1H,11H-eicosafluoroundecyl-3,3 - dimethylglutarate obtained was a solid which, when recrystallized from ethyl alcohol, gave a melting point of 60° C.–69° C.

EXAMPLE 5

The details of Example 1 were repeated using 100 g. (0.188 mole) of 1H,1H,11H-eicosafluoroundecyl alcohol ($C_{11}$), 15.0 g. (0.094 mole) of 3,3-dimethylglutaric acid, 150 ml. of benzene and 1 g. of concentrated sulfuric acid as catalyst. The di-1H,1H,11H-eicosafluoroundecyl ester of 3,3-dimethylglutaric acid was a solid which, when recrystallized from benzene, gave a melting point of 73° C.–76° C.

The following Table I lists several physical properties of the fluoroalkyl esters of camphoric acid and of various glutaric acids.

test, a discoloration of the oil was accompanied by the formation of a carbon deposit. In like manner, di-(1H-1H,7H-dodecafluoroheptyl)-3-methylglutarate also blackened and deposited a considerable amount of sludge when subjected to the same test.

Table I
VISCOMETRIC PROPERTIES OF DIBASIC ESTERS

| Diester Components | Viscosity, cs. | | Viscosity Index (ASTM-D567) | ASTM Slope (100–210° F.) | Temp., ° F., Visc.= 10,000 cs. |
|---|---|---|---|---|---|
| | 210° F. | 100° F. | | | |
| 1H,1H,7H-dodecafluoroheptyl alcohol and— | | | | | |
| glutaric acid | 3.501 | 22.48 | −24 | 0.882 | −35 |
| 3-methylglutaric acid | 3.717 | 26.24 | −48 | 0.894 | −35 |
| 2,2-dimethylglutaric acid | 3.678 | 26.30 | −57 | 0.902 | −30 |
| 3,3-dimethylglutaric acid [1] | 3.872 | 28.36 | −50 | 0.894 | −30 |
| 3-ethyl-3-methylglutaric acid | 4.196 | 32.83 | −49 | 0.888 | −25 |
| camphoric acid | .820 | 113.8 | −1 | 0.858 | +10 |
| 1H,1H,7H-dodecafluoroheptyl alcohol, 1H,1H,9H-hexadecafluorononyl alcohol and— | | | | | |
| 3,3-dimethylglutaric acid | 4.674 | 39.56 | −28 | 0.880 | −20 |
| camphoric acid | 9.47 | 148.6 | −1 | 0.852 | +20 |

[1] Values listed for the diester of 3,3-dimethylglutaric acid are the average obtained from examples 1 and 2.

It can be seen from Table I that, although the camphorate esters have a good viscosity-temperature relationship, they are much more viscous and are not satisfactory for use at low temperatures. Also, the methyl groups in the 2,2 position decrease the viscosity index and increase the ASTM slope.

OXIDATIVE CORROSION TEST

The oxidative stability and simultaneous corrosive effect on metals were determined by the 24 hour, 500° F. oxidation corrosion test as described by E. E. Sommers and B. M. Sturgis in U.S. Patent 2,840,593. The results are shown in Table II.

The remarkable stability of the diesters of this invention render them especially useful as hydraulic fluids over a wider temperature range than heretofore possible, being applicable at higher as well as lower temperatures than are the known camphorates of corresponding fluoroalcohols.

The exceptional stability of the polyfluoroalkyl diesters of 3,3-dimethylglutaric acid of this invention renders them particularly suitable for use as bearing lubricants, and buoyancy and damping fluids for measuring and recording instruments used in high speed aircraft and like vehicles subjected to severe conditions of oxidation over a wide range of temperatures. The good color stability

Table II
OXIDATIVE STABILITY CHARACTERISTICS OF DIBASIC ESTERS
[24 hour—500° F. test]

| Diester Components | Cu Catalyst, Wt. Loss mg./cm.² | Fluid Appearance | | Final Total Acid No. mg. KOH/g. | Viscosity Change, Percent | |
|---|---|---|---|---|---|---|
| | | Before | After | | 210° F. | 100° F. |
| 1H,1H,7H-dodecafluoroheptyl alcohol and— | | | | | | |
| glutaric acid | 0.49 | almost colorless | red-brown | 4.8 | +1.7 | +8.3 |
| 3-methylglutaric acid | 0.29 | do | do | 2.5 | −5.0 | −0.8 |
| 2,2-dimethylglutaric acid | 0.34 | do | do | 4.5 | +14 | +4.1 |
| 3,3-dimethylglutaric acid | 0.28 | colorless | light amber | 1.4 | −1.9 | −0.8 |
| 3-ethyl-3-methylglutaric acid | 0.40 | almost colorless | red-brown | 2.5 | −6.0 | −5.0 |
| camphoric acid | 0.40 | do | do | 1.8 | −11 | −15 |
| 1H,1H,7H-dodecafluoroheptyl alcohol, 1H,1H,9H-hexadecafluorononyl alcohol and— | | | | | | |
| 3,3-dimethylglutaric acid | 0.41 | do | light amber | 1.5 | −2.1 | −1.9 |
| camphoric acid | 0.29 | do | dark brown | 1.8 | −15 | −19 |

The results shown in Table II demonstrate the unpredictable oxidative stability of the diesters of 3,3-dimethylglutaric acid of this invention. They possess a remarkable combination of features including smaller viscosity change, small acid number, little corrosive effect and above all color stability. The two methyl groups in the 3,3 position greatly increase the oxidative stability of the esters over the glutaric acid esters and the 3-methylglutaric acid esters at 500° C. These results are not obtained by placing the methyl groups in the 2,2 position or by substituting a 3-ethyl group for a 3-methyl group.

A more rigorous stability test was conducted at 572° F. (300° C.), which consisted of placing a 20 g. sample of di-(1H,1H,7H-dodecafluoroheptyl)-3,3-dimethylglutarate into a stainless steel container which was lowered into a Wood's metal bath held at 300° C. A stream of dry air was bubbled through the heated oil at the rate of 6 liters per hour for 16 hours. At the end of this time, the 3,3-dimethylglutarate turned somewhat darker but no sludge or deposit was formed. On the other hand, when the corresponding known 1H,1H,7H-dodecafluoroheptyl camphorate diester was subjected to the same of these diesters renders them useful in industrial applications, such as oil bath fluids, where visibility as well as high temperature stability is a requirement.

It will be understood that the preceding examples have been given for illustrative purposes solely and that this invention is not limited to the specific embodiments described therein. On the other hand, it will be readily apparent to those skilled in the art that, subject to the limitations set forth in the general description, many variations can be made in the materials, proportions, conditions and techniques employed, without departing from the spirit or scope of this invention.

It will be apparent from the preceding description, that this invention provides a novel class of polyfluoroalkyl esters which have an unusual combination of desirable properties, whereby they are useful for a wide variety of purposes and particularly are extremely useful as stable fluids and lubricants for use in recording and measuring instruments subjected to a wide range of temperatures, especially those subjected to extreme temperatures and severe operating conditions. Accordingly, it will be apparent that this invention constitutes a valuable advance in and contribution to the art.

The embodiments of the invention in which an exclusive property or privilege is claimed are defined as follows:

1. A polyfluoroalkyl diester of 3,3-dimethylglutaric acid having the formula

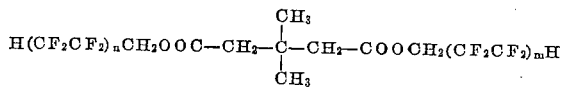

wherein each of $n$ and $m$ represents an integer of from 1 to 5.

2. A polyfluoroalkyl diester of 3,3-dimethylglutaric acid having the formula

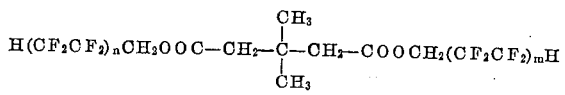

wherein each of $n$ and $m$ represents an integer of from 1 to 4.

3. A polyfluoroalkyl diester of 3,3-dimethylglutaric acid having the formula

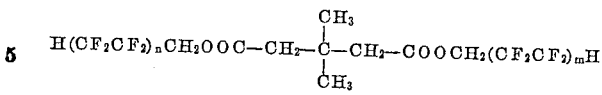

wherein each of $n$ and $m$ represents an integer of from 3 to 4.

4. Di-(1H,1H,7H-dodecafluoroheptyl)-3,3-dimethylglutarate.

5. Di-(1H,1H,9H-hexadecafluorononyl)-3,3-dimethylglutarate.

6. The normally liquid mixture of diesters of 3,3-dimethylglutaric acid and an equimolecular mixture of 1H,1H,7H-dodecafluoroheptyl alcohol and 1H,1H,9H-hexadecafluorononyl alcohol which mixture has a boiling range of about 160° C.–175° C. at less than 1 mm. of mercury.

References Cited in the file of this patent
UNITED STATES PATENTS
2,921,957   O'Rear et al. _____ Jan. 19, 1960